March 9, 1965   J. L. WISE   3,172,704
WHEEL COVER
Filed Sept. 5, 1963   2 Sheets-Sheet 1
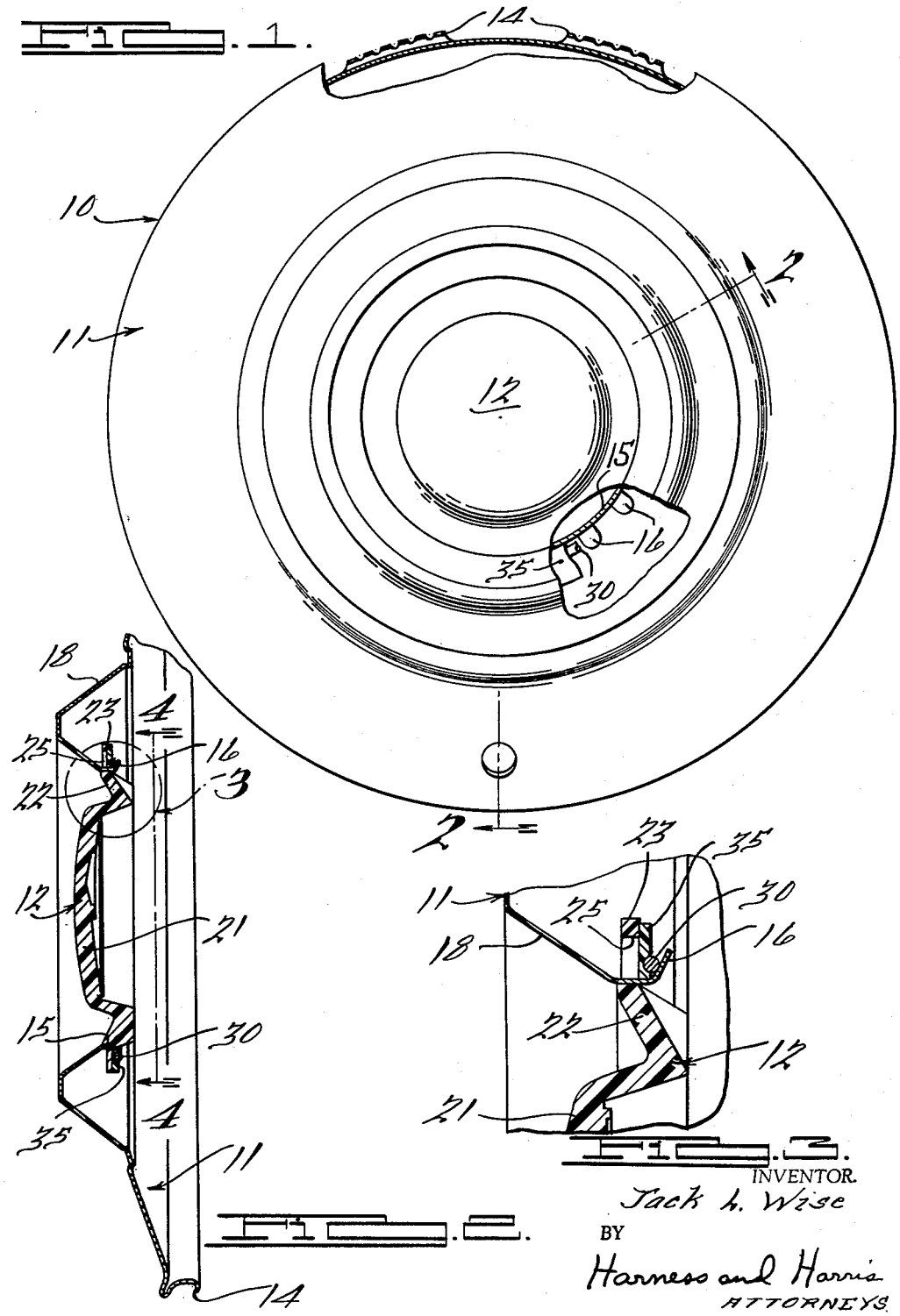
INVENTOR.
Jack L. Wise
BY
Harness and Harris
ATTORNEYS

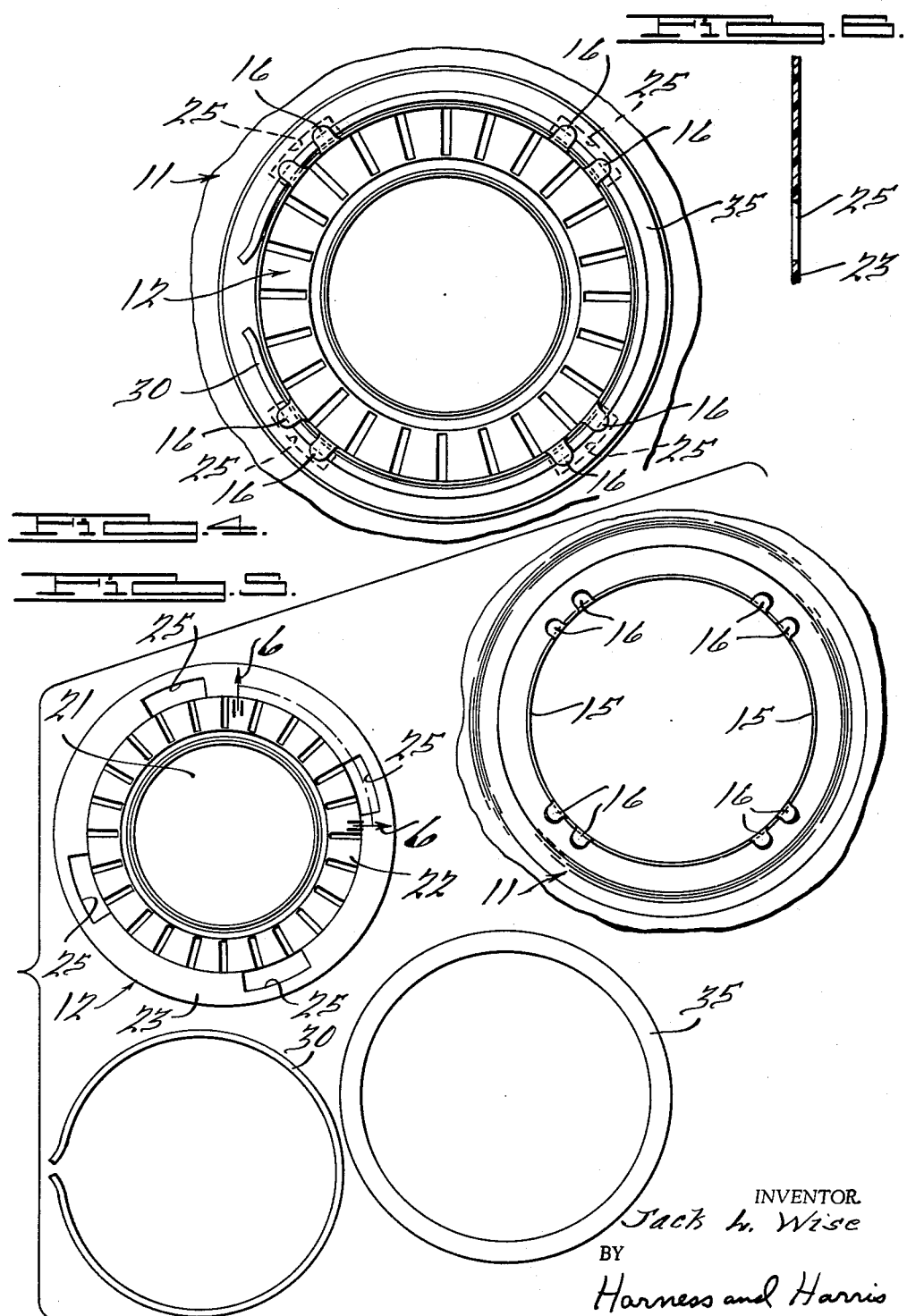

United States Patent Office 3,172,704
Patented Mar. 9, 1965

3,172,704
WHEEL COVER
Jack L. Wise, Rochester, Mich., assignor to Chrysler
Corporation, Highland Park, Mich., a corporation of
Delaware
Filed Sept. 5, 1963, Ser. No. 306,860
4 Claims. (Cl. 301—37)

This invention relates to a wheel cover and particularly to a wheel cover having a detachable hub or center disc portion that is frequently referred to as the medallion portion of the wheel cover.

It is a primary object of this invention to provide a novel means for detachably connecting the medallion disc member of a wheel cover to the cover ring member whereby a sealed, anti-rattle, positive locking, easily assembled, connection is achieved.

It is another object of this invention to provide an inexpensive, anti-rattle, connection between a wheel cover ring and its central medallion disc that is economical and simple to manufacture, easy to assemble, and arranged such that resilient cam means automatically compensate for variations in manufacturing tolerances that might otherwise produce an unsightly and/or a noisy wheel cover assembly.

It is still another object of this invention to provide a wheel cover with a readily detachable, centrally positioned, medallion disc that is rattle-free, easily assembled on and detached from the cover plate, and designed for installation with a minimum number of simple operations that utilize commercially available inexpensive parts.

It is still another object of this invention to provide a wheel cover unit having a centrally positioned medallion disc that is detachably connected to the surrounding wheel cover ring portion by a snap ring connection providing a sealed anti-rattle locking means that is simple in design, economical to manufacture and install and arranged such that its cam latching means compensates for manufacturing tolerances.

Other objects and advantages of this invention will be readily apparent from a reading of the following description and a consideration of the related drawings wherein:

FIG. 1 is a front elevational view with portions broken away and shown in section, of a wheel cover assembly embodying this invention and adapted to be detachably connected to the wheel on a motor vehicle;

FIG. 2 is a fragmentary sectional elevational view taken along the line of and looking in the direction of the arrows 2—2 of FIG. 1;

FIG. 3 is an enlarged fragmentary sectional elevational view of that structure of the wheel cover assembly shown in FIG. 2 and included within the circle 3 thereof;

FIG. 4 is a fragmentary rear elevational view taken along the line of and looking in the direction of the arrows 4—4 of FIG. 2;

FIG. 5 is an exploded view of the four elements comprising the disclosed wheel cover assembly with portions of the cover ring being broken away for space saving and clarity; and FIG. 6 is a fragmentary sectional elevational view taken along the line of and in the direction of the arrows 6—6 of the medallion disc shown in FIG. 5.

The drawings show a wheel cover, generally designated by the reference numeral 10, that comprises a cover plate ring member 11 having a centrally located medallion disc member 12 detachably connected to the plate ring 11. The disc member 12 has a body portion of such size and shape that it completely fills the central opening in plate 11. Disc member 12 has a flange portion 23 that overlaps the inner edge 15 of ring 11. In a preferred form of this invention the cover plate disc 11 is formed of sheet metal such as stainless steel, aluminum or various other noncorrosive metals or alloys thereof. The medallion disc, in a preferred form of this invention, is formed from a plastic material that lends itself to decoration by coloring, vacuum deposition, embossing, plating, painting or any other known plastic decorative process. With an arrangement using a detachable medallion 12, it is thought to be obvious that the same cover disc 11 can be used for many different wheel cover units with the medallion disc 12 being varied to designate different vehicles, or models, or categories thereof. Furthermore, by having a detachable medallion 12 it greatly facilitates the decoration of the medallion for only a relatively small size, lightweight element need be processed rather than a complete wheel cover unit. Also, the use of a plastic medallion disc gives a wide choice of decorative processes which do not involve certain disadvantages encountered when metal or alloys thereof are used for both the cover ring and the medallion disc. While the advantages of plastics for the detachable medallion are obvious, still, this invention is not limited to any specific material because the medallion attachment means disclosed herein is intended for use with any materials or combinations thereof.

Wheel cover 10 is adapted to be detachably anchored to the rim or web portion of a vehicle wheel by peripheral tooth-like formations 14 that are shown in FIG. 1. These teeth 14 bite into the associated wheel structure (not shown) and frictionally engage the wheel cover with the associated wheel structure. As the tooth means 14 for attaching the cover 10 to its associated wheel are conventional and ancillary to this invention, additional description of the teeth 14 is not believed necessary.

The overall cross sectional shape of the wheel cover ring 11 (see FIG. 2) is not limiting, as regards this invention, but the specific shape of the inner periphery of the cover ring member 11 is important. From FIGS. 2-5 it will be noted that the inner peripheral edge 15 of the dished cover ring 11 has formed thereon circumferentially spaced sets of rearwardly and radially outwardly projecting ears or tabs 16. In the instance shown there are four (4) sets of equally spaced ears or tabs 16 with each set comprising two (2) tabs. Obviously, the circumferential spacing of the ears 16 and the number of ears or tabs 16 located at any point around the inner periphery of cover disc 11 can be varied without departing from the scope of this invention. These ears or tabs 16 function as cam means with snap ring 30 to anchor the cover medallion 12 to the cover ring 11 in a manner that will be described in detail hereafter.

While the general shape of the cover ring 11 can be varied considerably and still take advantage of this invention, it will be noted that forming an outwardly projecting annular rib 18 concentrically around and radially outwardly of the inner peripheral edge 15 provides a frame that directs attention towards and accents the medallion disc 12. However, the connecting means, to be described hereafter, for mounting the medallion disc 12 in the opening in the cover 11 will function perfectly with various shapes of cover plate rings.

The medallion disc 12 can be considered to be formed by a central dished plate portion 21 surrounded by an angularly projecting spoked or ribbed, ring portion 22 that is encircled by a radially projecting flange or rim portion 23. At the junction, between the ring portions 22 and the flange portion 23 there are circumferentially extending slots 25 spaced to be aligned with and to receive the spaced sets of tabs 16.

The novel means for cooperating with the medallion disc slots 25 and the wheel cover tabs 16 so as to cammingly lock the medallion disc 12 on the cover ring 11 in the resilient C-shaped snap ring 30. Looking at FIGS. 2, 3 and 4 in particular, it will be noted that after the medallion disc 12 has been placed against the rear face of the center portion of the wheel cover 11 with the tabs 16 on cover 11 projecting through the slots 25 on the flange 23 of the medallion disc 12, that then the C-shaped snap ring 30 is expanded and sprung into locking position between the ring tabs 16 and the disc flange portion 23. Because of the radially inwardly converging angularity of the tabs 16 (see FIG. 3) and the tendency of the expanded, C-shaped, resilient, snap ring 30 to circumferentially contract, a camming force is developed between the tabs, the snap ring and the flange that pulls the disc flange 23 into tight, anti-rattle engagement with the inner peripheral edge 15 of the wheel cover ring 11.

In the drawings there is shown an elastomeric washer 35 that can be positioned between the disc flange 23 and the sets of cover tabs 16. This compressible washer 35, that can be made from a rubber-like composition or a urethane foam material, provides a tight seal between the wheel ring inner periphery 15 and the flange 23 of the medallion disc. The compressible resilient washer 35 also acts to prevent any rattle between the snap ring 30, the tabs 16, the disc flange 23 and the engaged portion 15 of the wheel cover ring. With a washer 35 it is possible to make the diameter of the snap ring 30 smaller and still produce the desired camming action. While the form of this invention herein disclosed uses a compressible resilient washer 35, still, it is clearly within the scope of this invention to eliminate the washer 35 and to have a snap ring 30 extend directly between the angled ring tabs 16 and the associated flange 23 of the medallion disc. It is obvious that if the compressible washer 35 is eliminated that then the space occupied thereby must be compensated for by increasing the thickness of the snap ring 30 or by changing the size or shape of the ring tabs 16 or varying the shape or dimensions of these locking parts such that the desired camming action will be existent between the ring 30 and tabs 16 to produce a rigid anti-rattle connection between the ring 11 and disc 12.

The wheel cover unit 10 herebefore described has proven to be most acceptable from both an ornamental, mechanical and cost standpoint. The detachable, medallion disc 12 lends itself to many varied and inexpensive methods of ornamentation because of its relatively small size, light weight and symmetrical shape. The cover ring 11 can be economically and readily formed because of the center aperture that receives the medallion disc. Also, the simple type of tabs or ears 16 lend themselves to formation during the wheel ring stamping process. Furthermore, the tabs 16 can be bent to any desired angle to compensate for manufacturing tolerances and thus a sure-fit, anti-rattle connection of the disc 12 to the ring 11 is assured. Because of the camming action between the tabs 16 and the snap ring 30 a firm, anti-rattle connection, that is sealed by the washer 35, is achieved by the simplest of means. Cost-wise this type of wheel cover is very attractive for the reasons already pointed out and because no machine or bending step is required to install the snap ring 30 and produce the cam lock of the disc 12 to the ring 11.

I claim:

1. A wheel cover comprising a ring member having a plurality of tabs spaced circumferentially around the inner peripheral edge portion of said ring member and having portions projecting rearwardly and radially outwardly from the rear side of said ring member, a disc member having a body portion positioned in and shaped to close the central opening in said ring member, said disc member having a peripheral flange portion that projects radially outwardly beyond the inner peripheral edge of said ring member, said flange portion having slots therein aligned with and receiving said ring member tabs, that project rearwardly beyond the rear side of said flange portion and a resilient snap ring encircling and positioned between said tab portions and said flange portion and contractively engaged with said tab portions to connect said disc member to said ring member, said snap ring reacting against said tab portions so as to cammingly urge said disc member flange portion into anti-rattle engagement with the inner peripheral edge portion of said ring member.

2. A wheel cover comprising a ring member having a plurality of tabs spaced circumferentially around the inner peripheral edge portion of said ring member and having portions projecting radially outwardly and rearwardly from the rear side of said ring member, a disc member having a body portion positioned in and shaped to close the central opening in said ring member, said disc member having a peripheral flange portion that projects substantially radially outwardly beyond the inner peripheral edge of said ring member, said flange portion having slots therein aligned with and receiving said ring member tabs that project rearwardly beyond the rear side of said flange, a compressible sealing washer mounted on the rear side of said disc member flange portion, and a locking ring positioned between said tab portions and said flange portion and contractively engaged with said tabs to connect said disc member to said ring member, said locking ring comprising a resilient, substantially C-shaped, snap ring that reacts against said ring member tab portions and said flange portion so as to cammingly urge said disc member flange portion into anti-rattle, sealing engagement with the inner peripheral edge portion of said ring member.

3. A wheel cover comprising a dished ring member having an annular rib surrounding the central opening in said ring member and projecting forwardly from the convex face of said ring member, said ring member including a plurality of tabs spaced circumferentially around the inner peripheral edge portion of said ring member and having portions projecting at an angle axially rearwardly and radially outwardly from the concave side of said dished ring member, a medallion disc member having a body portion positioned in and shaped to close the central opening in said ring member, said disc member having a peripheral flange portion that projects radially outwardly beyond the inner peripheral edge of said ring member on the concave side thereof, said flange portion having circumferentially spaced slots therein aligned with and receiving said ring member tabs that project rearwardly beyond the rear side of said flange, and a resilient snap ring surrounding said tab portions and positioned between said ring member tabs and said disc member flange portion, said snap ring being contractively engaged with said angularly positioned tab portions to connect said disc member to said ring member, said snap ring reacting against said tabs and said flange so as to cammingly urge said disc member into anti-rattle engagement with the inner peripheral edge portion of said ring member.

4. A wheel cover comprising a dished ring member having connector means on its outer periphery to attach the cover to a wheel member and having an annular rib surrounding the central opening in said ring member and projecting forwardly from the convex face of said ring member, said ring member including a plurality of tabs spaced circumferentially around the inner peripheral edge portion of said ring member and having portions projecting at an angle axially rearwardly and radially outwardly from the concave side of said dished ring member, a medallion disc member having a body portion positioned in and shaped to close the central opening in said ring member, said disc member having a peripheral flange portion that projects radially outwardly beyond the inner peripheral edge of said ring member on the concave side thereof, said flange portion having slots therein aligned with and receiving said ring member tabs that project rearwardly beyond the rear side of said flange and a resilient, C-shaped, snap ring surrounding said tabs and positioned between said ring member tab portions and said disc member flange portion, said snap ring being contractively engaged with said angularly positioned tab portions to connect said disc member to said ring member, said snap ring reacting against said tabs and said flange so as to cammingly urge said disc member into anti-rattle engagement with the inner peripheral edge portion of said ring member.

References Cited by the Examiner

UNITED STATES PATENTS

| | | | |
|---|---|---|---|
| 1,344,455 | 6/20 | Schroeder | 292—256.61 |
| 2,674,495 | 4/54 | Lyon | 301—37 |
| 2,821,438 | 1/58 | Lyon | 301—37 |
| 3,032,229 | 5/62 | Schoepe et al. | 220—55 |

FOREIGN PATENTS 1,229,438  3/60  France.

ARTHUR L. LA POINT, *Primary Examiner.*